(12) United States Patent
Farwaha et al.

(10) Patent No.: US 8,920,920 B2
(45) Date of Patent: Dec. 30, 2014

(54) POLYMER LATEX BLENDS AND APPLICATIONS THEREOF

(71) Applicant: Celanese International Corporation, Irving, TX (US)

(72) Inventors: Rajeev Farwaha, Mead, NJ (US); Chris L. Lazaroff, Simpsonville, SC (US); Frederick F. Cazenave, III, Flower Mound, TX (US); Nancy Susan Coulson, Cincinnati, OH (US)

(73) Assignee: Celanese International Corporation, Irving, TX (US)

( * ) Notice: Subject to any disclaimer, the term of this patent is extended or adjusted under 35 U.S.C. 154(b) by 12 days.

(21) Appl. No.: 13/678,971

(22) Filed: Nov. 16, 2012

(65) Prior Publication Data

US 2013/0130025 A1    May 23, 2013

Related U.S. Application Data

(60) Provisional application No. 61/561,480, filed on Nov. 18, 2011.

(51) Int. Cl.

| | |
|---|---|
| *B05D 3/12* | (2006.01) |
| *G03G 5/10* | (2006.01) |
| *C08G 73/10* | (2006.01) |
| *C08K 3/22* | (2006.01) |
| *C09D 131/04* | (2006.01) |
| *C09D 123/08* | (2006.01) |
| *C09D 125/00* | (2006.01) |
| *C08L 23/08* | (2006.01) |

(52) U.S. Cl.
CPC ........ *C09D 131/04* (2013.01); *C09D 123/0853* (2013.01); *C09D 125/00* (2013.01); *C08L 23/0853* (2013.01)
USPC ........ 428/342; 428/537.5; 427/359; 427/361; 524/359; 524/413; 524/427; 524/447; 524/503; 524/516; 524/523

(58) Field of Classification Search
None
See application file for complete search history.

(56) References Cited

U.S. PATENT DOCUMENTS

| | | |
|---|---|---|
| 3,337,482 A | 8/1967 | Watanabe et al. |
| 3,942,995 A | 3/1976 | Ichikawa et al. |
| 4,294,704 A | 10/1981 | Daniel et al. |
| 4,395,499 A | 7/1983 | Rosenski et al. |
| 4,735,986 A | 4/1988 | Iacoviello |
| 4,879,336 A | 11/1989 | Schilling et al. |
| 5,026,765 A | 6/1991 | Katz et al. |
| 5,117,128 A | 5/1992 | Albrecht et al. |
| 5,177,128 A | 1/1993 | Lindemann et al. |
| 5,849,389 A | 12/1998 | Lunsford |
| 6,359,076 B1 | 3/2002 | Lunsford et al. |
| 7,244,510 B2 | 7/2007 | Van Den Abbeele et al. |
| 2005/0287336 A1 | 12/2005 | Lunsford et al. |
| 2007/0128460 A1 | 6/2007 | Miller et al. |
| 2007/0232743 A1 | 10/2007 | Laviolette et al. |
| 2011/0178230 A1 * | 7/2011 | Lazarus et al. ................ 524/563 |
| 2012/0009379 A1 | 1/2012 | Muller et al. |

FOREIGN PATENT DOCUMENTS

| | | |
|---|---|---|
| DE | 3622820 | 1/1988 |
| DE | 3924846 | 2/1991 |
| EP | 1396576 | 3/2004 |
| GB | 1578108 | 10/1980 |
| JP | 56-129242 | 10/1981 |
| JP | 58-104278 | 6/1983 |
| JP | 58-152037 | 9/1983 |
| JP | 61-252279 | 11/1986 |
| JP | 2-169800 | 6/1990 |
| JP | 7-279093 | 10/1995 |
| JP | 8-158296 | 6/1996 |
| JP | 2004-76189 | 3/2004 |
| WO | WO 2009/120370 | 10/2009 |
| WO | WO 2011/139267 | 11/2011 |
| WO | WO 2011/140065 | 11/2011 |
| WO | WO 2012/080007 | 6/2012 |
| WO | WO 2012/082141 A1 | 6/2012 |

OTHER PUBLICATIONS

International Search Report and Written Opinion mailed Feb. 21, 2013 in corresponding International Application No. PCT/US2012/065479.

\* cited by examiner

*Primary Examiner* — Sheeba Ahmed

(57) ABSTRACT

Disclosed are blended latex dispersions which can be used as binders in paper coating compositions. Such latex dispersions comprise a first copolymer of a vinyl ester of an alkanoic acid having from 1 to 13 carbon atoms and ethylene; and a second copolymer of (i) styrene and butadiene, (ii) styrene, butadiene and acrylonitrile, or (iii) styrene and an acrylic monomer, wherein the first and second copolymers are colloidally dispersed in an aqueous medium comprising a surfactant. The paper coating compositions containing latex dispersion binders of this type preferably exhibit especially desirable coating strength as quantified by the Dry Pick Values which such compositions provide.

45 Claims, 5 Drawing Sheets

Brightness
Examples 14-18

Roughness
Examples 14-18

IGT Pick (Dry)
Examples 19-22

Roughness
Examples 19-22

IGT Pick (Dry)
Examples 29-41

Roughness
Examples 29-41

IGT Pick (Dry)
Examples 42-54

Roughness
Examples 42-54

Gloss
Examples 55-59

Brightness
Examples 55-59

POLYMER LATEX BLENDS AND APPLICATIONS THEREOF

CROSS-REFERENCE TO RELATED APPLICATIONS

This application claims priority to U.S. Provisional Appl. No. 61/561,480, filed Nov. 18, 2011, the entirety of which is incorporated herein by reference.

FIELD OF THE INVENTION

The present invention relates to a latex blend comprising a vinyl ester/ethylene first copolymer and a second copolymer, which preferably demonstrates enhanced pick strength when used in paper coating formulations.

BACKGROUND OF THE INVENTION

Pigmented paper coating formulations generally comprise an aqueous synthetic polymer binder dispersion and pigment and may contain other additives typically used in the paper coating art. Illustrative of the polymer binders in the dispersions are vinyl acetate copolymers and interpolymers, including vinyl acetate/ethylene (VAE) and vinyl acetate/alkyl acrylate copolymers and interpolymers, and styrene/butadiene styrene/acrylate copolymers. Such copolymers and interpolymers can also contain other co-monomers such as, for example, a copolymerized ethylenically unsaturated mono- or dicarboxylic acid or other unsaturated co-monomers which can function as cross-linking agents.

U.S. Pat. No. 4,395,499, for example, discloses high strength pigment binders for paper coatings having increased water retention and stability. The coating compositions contain an aqueous synthetic polymer latex comprising a dispersed interpolymer of a vinyl ester; a polyethylenically unsaturated co-monomer which can be triallyl cyanurate, triallyl isocyanurate, diallyl maleate, diallyl fumarate, divinyl benzene or diallyl phthalate; an ethylenically unsaturated mono- or dicarboxylic acid co-monomer or half ester thereof; and optionally an alkyl acrylate co-monomer.

Notwithstanding the availability of these various types of paper coating binder dispersions, there is a persistent need for coated paper and coated paperboard producers to identify paper coating dispersions (i.e., paper coating binders) which provide, when used in paper coating compositions, increased binding strength when the compositions are applied to paper and paperboard products. Most often, binding strength is quantified by a paper test called the IGT pick resistance test. In the IGT pick test, the greater the IGT value, the stronger the binder.

A variety of emulsion polymerization components and techniques can influence binding strength, but, in general, vinyl acetate-based binders (e.g., polyvinyl acetate, vinyl acetate-ethylene, vinyl acetate-acrylate, and the vinyl acetate-based binders discussed above) are known to provide lower binding strength than more commonly used coating binders like styrene butadiene and styrene acrylics. To compensate for the lower IGT pick resistance provided by paper coating compositions using such vinyl ester based binders, higher binder levels are required, which, of course, hurts the profitability of the coated paper and paperboard products made with these types of coating binders. In addition, those skilled in the art will appreciate that high binder levels may result in adverse properties, e.g., reduced ink absorption.

Over the years, a few VAE copolymers and interpolymers have been developed for paper coating applications. U.S. Pat. No. 3,337,482, for example, discloses paper coating compositions containing pigments and binder dispersions comprising copolymers of ethylene, vinyl acetate and ethylenically unsaturated mono- or di-carboxylic acids such as acrylic acid or maleic acid. The binder dispersions of the '482 patent are prepared by emulsion polymerization of the co-monomers using a nonionic emulsifier which contains polyoxyethylene oleyl or lauryl phenyl ethers.

U.S. Pat. No. 5,177,128 discloses a paper coating composition containing a first polymer network intertwined on a molecular scale with a second polymer network. The process involves making a first polymer dispersion and mixing a second monomer dispersion with the first polymer dispersion. The dispersion mixture is polymerized to provide a first polymer network with is intertwined on a molecular scale with the second polymer network.

The most effective nonionic emulsifiers found to stabilize dispersions of VAE copolymers belong to a general class of nonionic surfactants called alkylphenol ethoxylates (APEs). APEs have been typically used in VAE latex products to improve emulsion polymerization and film forming, and in coating formulations to provide pigment wetting. However, these APE compounds are believed to break down in the environment into related compounds that are persistent in the environment and that may act as endocrine disruptors. Due in part to regulations in Europe, as well as recently adopted water quality criteria in the United States, the evolving environmental controls on APEs are reminiscent of the 1970s ban on lead compounds in paint. In view of the foregoing, the use of APE-type nonionic emulsifiers in VAE dispersion-containing products is increasingly viewed as disadvantageous.

In light of the developing need to address potential problems with utilizing phenol free-emulsifiers in place of the heretofore more conventionally used APEs, and in further view of the need to overcome issues associated with handling ethylene gas on a large scale basis, the use of VAE-based paper coating compositions has not to date been particularly commercially significant. Other issues including possible lack of FDA compliance and/or relatively high Volatile Organic Compound (VOC) content have also worked against the commercial use of VAE-based coating compositions.

More recently, however, the equipment and expertise has been developed to polymerize and stabilize environmentally-friendly vinyl ester/ethylene, e.g., VAE, coating binders very easily on a commercial production scale. Accordingly, the current state of the emulsion polymerization art with respect to surfactant-stabilized vinyl ester/ethylene copolymers make such polymeric materials very desirable candidates for paper/paperboard coating applications. Such commercial potential for VAE-based products can be realized if the binding strength exhibited by such VAE-type binders, in addition to other properties such as gloss, brightness, and roughness/smoothness, can be made comparable to the binding strength of non-vinyl ester-based binders such as those based on styrene butadiene and styrene acrylics.

The need therefore exists for improved VAE-based latex compositions (optionally free of APEs), coating compositions and processes for making such coating compositions having desired physical characteristics, such as binding strength, gloss, brightness and smoothness.

SUMMARY OF THE INVENTION

It has now been discovered that by blending vinyl acetate/ethylene (VAE) dispersions with certain other copolymer dispersions, latex blends may be prepared having especially desirable physical properties, such as good pick strength, ink transfer characteristics, roughness, gloss and brightness/ whiteness. Such latex binders are desirable because they can be used to provide especially effective and environmentally friendly coating compositions for paper and paperboard applications.

In one embodiment, the present invention is directed to a latex dispersion, comprising: (a) a first copolymer of a vinyl ester of an alkanoic acid having from 1 to 13 carbon atoms, e.g., acetic acid or neodecanoic acid, and ethylene; and (b) a second copolymer of (i) styrene and butadiene, (ii) styrene, butadiene and acrylonitrile, or (iii) styrene and an acrylic monomer, wherein the first and second copolymers are colloidally dispersed in an aqueous medium comprising a surfactant. The dispersion preferably is free of or substantially free of colloidal stabilizers such as polyvinyl alcohol, optionally comprising less than 1.5 pphm, less than 1.0 pphm, or less than 0.5 pphm polyvinyl alcohol.

The first copolymer optionally is present in an amount from 40 to 99 wt. %, e.g., from 70 to 95 wt. %, and the second copolymer optionally is present in an amount from 1 to 60 wt. %, e.g., from 5 to 30 wt. %. The first copolymer optionally comprises from 70 to 90 pphm vinyl acetate and from 10 to 30 pphm of ethylene, and may have an average particle size from 100 to 300 nm, e.g., from 120 to 250 nm, or from 150 to 220 nm, as determined by Laser Aerosol Spectroscopy. The first copolymer optionally is a copolymer of vinyl acetate, ethylene and vinyl chloride. In another embodiment, the first copolymer is present in an amount from 60 to 99 wt. % and the second copolymer is present in an amount from 1 to 40 wt. %, and may or may not be substantially free of alkyl phenol ethoxylate surfactants. In another embodiment, the first copolymer is present in an amount from 40 to 99 wt. % and the second copolymer is present in an amount from 1 to 60 wt. %. In another embodiment, first copolymer is present in an amount from 70 to 95 wt. %, and the second copolymer is present in an amount from 5 to 30 wt. %. In another embodiment, the first copolymer is present in an amount from 5 to 65 wt. %, and the second copolymer is present in an amount from 35 to 95 wt. %. The first and/or second copolymer may be functionalized, e.g., epoxy functionalized, carboxyl functionalized, silane functionalized or a combination thereof.

The second copolymer optionally is a copolymer of styrene and butadiene; a copolymer of styrene, butadiene and acrylonitrile; or a copolymer of styrene and an acrylic monomer, optionally a copolymer of styrene and an acrylate. In one aspect, the second copolymer comprises from 20 to 80 pphm of styrene and from 20 to 80 pphm of butadiene. In another embodiment, the second copolymer comprises from 20 to 75 pphm of styrene, from 20 to 75 pphm of butadiene and from 1 to 25 pphm of acrylonitrile. In another embodiment, the second copolymer comprises from 20 to 80 pphm of styrene, and from 20 to 80 pphm of the acrylic. In another embodiment, the second copolymer comprises from 20 to 75 pphm of styrene, from 20 to 75 pphm of butadiene and from 1 to 25 pphm of acrylonitrile.

The dispersion optionally further comprises a pigment selected from the group consisting of kaolin clay, calcium carbonate, titanium dioxide, plastic pigments and combinations of such pigments. The latex dispersion optionally is stabilized with anionic and/or nonionic emulsifiers that may or may not be substantially free of APE surfactants. In one aspect, the dispersion is stabilized with an ethoxylated nonionic surfactant. In one embodiment, the dispersion has a solids content from 40 to 70 wt. %.

The dispersion may comprise an internal crosslinker, an external crosslinker or both. For example, the first copolymer and/or the second copolymer optionally further comprises a polyethylenically unsaturated co-monomer selected from the group consisting of triallyl cyanurate, triallyl isocyanurate, diallyl maleate, diallyl fumarate, divinyl benzine, and diallyl phthalate. Exemplary external crosslinkers include ammonium zirconium carbonate and potassium zirconium carbonate. In a preferred embodiment, the dispersion comprises a blend of a first dispersion comprising the first copolymer and a second dispersion comprising the second copolymer. The first and second copolymers preferably are not intimately mixed. Preferably, either or both the first dispersion and/or the second dispersion or the resulting blended latex of the invention are free of, or are substantially free of, colloidal stabilizers such as polyvinyl alcohol, optionally comprising less than 1.5 pphm polyvinyl alcohol, less than 1 pphm polyvinyl alcohol, or less than 0.5 pphm polyvinyl alcohol, or optionally less than 1 wt. % polyvinyl alcohol, or less than 0.5 wt. % polyvinyl alcohol, based on the total weight of the monomers.

In another embodiment, the invention is to a coating formed from the inventive dispersion, preferably having a % IGT Dry Pick Value (as defined herein) of greater than 70%, greater than 80%, greater than 90%, greater than 100% or greater than 110%, based on a comparable coating formed from the second dispersion. The coating preferably has a SIWA % ink transfer value greater than 45% or greater than 90%. The coating optionally has a brightness value of at least 70, at least 79, at least 87, or at least 90. The coating optionally has a roughness value less than 3.2, less than 3.0, less than 2.8, or less than 2.5, less than 2.0 or less than 1.5. The coating optionally has a gloss value from 30 to 60, from 30 to 50 or from 35 to 45.

In another embodiment, the invention is to a coating composition, comprising an aqueous surfactant-stabilized, copolymer latex binder, and sufficient alkali to achieve a pH of 6 to 10, the latex binder having dispersed therein a first copolymer of an alkanoic acid having from 1 to 13 carbon atoms and ethylene, and a second copolymer of (i) styrene and butadiene, (ii) styrene, butadiene and acrylonitrile, or (iii) styrene and an acrylic monomer, wherein the latex binder is stabilized with anionic and/or non-ionic emulsifiers.

The coating composition preferably further comprises a pigment selected from the group consisting of clay, calcium carbonate, titanium dioxide, plastic pigments and combinations of said pigments.

In another embodiment, the invention is to a paper or paperboard substrate coated with from 1 g/m$^2$ to 30 g/m$^2$ of the above-described coating composition, e.g., from 15 to 25 g/m$^2$.

In another embodiment, the invention is to a paper coating composition, comprising the above-described latex dispersion, one or more pigments and one or more crosslinkers.

In another embodiment, the invention is to a process for forming a coated substrate product, the process comprising the steps of: (a) coating a substrate with the coating composition described above to form a wet coated substrate; (b) drying the wet coated substrate to form a dried coated substrate; and (c) calendering the dried coated substrate to form the coated substrate product. The coated substrate product optionally comprises a coated paper substrate product.

BRIEF DESCRIPTION OF THE DRAWINGS

The present invention will be better understood in view of the appended non-limiting figures in which.

DETAILED DESCRIPTION OF THE INVENTION

Figure 1:
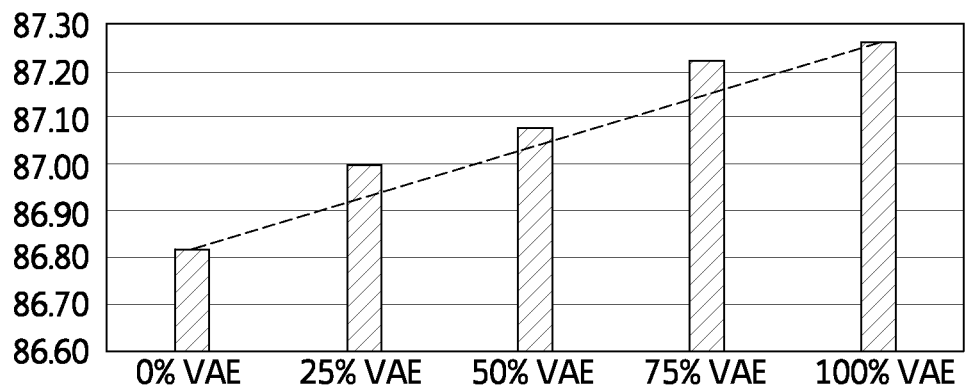
FIG. 1 is a graph showing improved brightness observed in latex blends comprising VAE and styrene/butyl acrylate/acrylonitrile copolymers.

The present invention relates to aqueous, surfactant-stabilized, latex dispersion blends that demonstrate excellent dry pick strength, ink transfer characteristics, roughness, gloss and brightness/whiteness when such dispersions are incorporated into coating compositions, and in particular into coating compositions for paper products. The latex dispersions of the present invention comprise: (a) a first copolymer of a vinyl ester of an alkanoic acid having from 1 to 13 carbon atoms and ethylene, and (b) a second copolymer of (i) styrene, butadiene and optionally a third monomer, e.g., acrylonitrile, or (ii) styrene and an acrylic monomer. The dispersions are preferably formed by blending a first dispersion with a second dispersion, wherein the first dispersion comprises the first copolymer, and the second dispersion comprises the second copolymer. The first and second copolymers are preferably dispersed in an aqueous medium comprising a surfactant.

The relative amounts of the first and second copolymers in the latex dispersions of the present invention may vary. Preferably, however, the latex dispersion comprises the first copolymer in an amount from 40 to 99 wt. %, e.g., from 60 to 99 wt. % or from 70 to 95 wt. %, and the second copolymer in an amount from 1 to 60 wt. %, e.g., from 1 to 40 wt. % or from 5 to 30 wt. %. In another embodiment, the first copolymer is present in an amount from 5 to 65 wt. %, and the second copolymer is present in an amount from 35 to 95 wt. %. In this context, the weight percent of a copolymer in the latex dispersion is based on the total solids content of the dispersion. In preferred embodiments, the first dispersion and/or the second dispersion or the resulting blended latex of the invention are free of, or are substantially free of, colloidal stabilizers such as polyvinyl alcohol, optionally comprising less than 1.5 pphm polyvinyl alcohol, less than 1 pphm polyvinyl alcohol, or less than 0.5 pphm polyvinyl alcohol or optionally less than 1 wt. % polyvinyl alcohol, or less than 0.5 wt. % polyvinyl alcohol, based on the total weight of the monomers.

As indicated, the first copolymer is a copolymer of a vinyl ester and ethylene as well as optionally one or more additional monomers, e.g., vinyl chloride. The vinyl ester utilized in the formation of the latex dispersions described herein is preferably an ester of an alkanoic acid. The alkanoic acid preferably comprises from 1 to 13 carbon atoms. A non-limiting list of examples of such esters include vinyl formate, vinyl acetate, vinyl propionate, vinyl butyrate, vinyl isobutyrate, vinyl valerate, vinyl-2-ethyl-hexanoate, vinyl isooctanoate, vinyl nonate, vinyl decanoate, vinyl pivalate, vinyl versatate, and mixtures thereof. Of the foregoing, vinyl acetate is a preferred monomer because of its ready availability and low cost. Preferred monomer combinations for the first copolymer include vinyl acetate/ethylene, vinyl acetate/vinyl propionate/ethylene, vinyl acetate/vinyl neodecanoate/ethylene, vinyl acetate/ethylene/vinyl chloride, and vinyl acetate/ethylene/butyl acrylate/acrylic acid.

The vinyl ester preferably is present in the first copolymer in an amount ranging from 70 to 90 pphm (parts per hundred based on total monomer in the specified copolymer), e.g., from 75 to 85 pphm. More preferably, the vinyl ester content of the first copolymer used in the latex dispersion of the coating compositions described will range from 78 pphm to 82 pphm.

Generally, a relatively high ethylene content in the first copolymer is desired in order to provide a binder latex dispersion that is especially effective in formulating coating compositions that provide desirably high binding strength. Thus, ethylene will generally comprise from 10 pphm to 30 pphm of the first copolymer, e.g., from 10 to 25 pphm or from 18 to 22 pphm. More preferably, ethylene will be present in the first copolymer in an amount ranging from 12 pphm to 20 pphm.

Preferably, the first copolymer is formed in a surfactant stabilized emulsion polymerization process rather than a protective colloid stabilized polymerization process. As a result, the average particle size of the first copolymer tends to be smaller than copolymers formed in the presence of protective colloids. In exemplary embodiments, the first copolymer has an average particle size from 50 to 500 nm, e.g., from 100 to 300 nm, from 120 to 250 nm, or from 150 to 220 nm, as determined by Laser Aerosol Spectroscopy.

Optionally, the first copolymer further comprises a co-monomer that acts as an internal crosslinker. For example, the first copolymer optionally further comprises a polyethylenically unsaturated co-monomer selected from the group consisting of triallyl cyanurate, triallyl isocyanurate, diallyl maleate, diallyl fumarate, divinyl benzene and diallyl phthalate. Preferred co-monomers of this type included diallyl maleate, diallyl fumarate and diallyl phthalate.

In some embodiments, the first copolymer includes a cross-linking co-monomer selected from α,β-ethylenically unsaturated $C_3$-$C_{10}$ mono-carboxylic acids, α,β-ethylenically unsaturated $C_4$-$C_{10}$ di-carboxylic acids and the anhydrides thereof, and the $C_1$-$C_{18}$ alkyl half-esters of the α,β-ethylenically unsaturated $C_4$-$C_{10}$ di-carboxylic acids. Exemplary co-monomers of this type include acrylic acid and methacrylic acid, maleic acid, maleic anhydride, fumaric acid, itaconic acid and the $C_4$-$C_8$ alkyl half esters of maleic acid. Maleic acid and maleic anhydride are the preferred co-monomers of this type.

In another embodiment, the first copolymer includes a cross-linking co-monomer selected from ethylenically unsaturated silane compounds. Exemplary ethylenically unsaturated silane co-monomers are disclosed, for example, in PCT Publ. WO 2011/139267, the entirety of which is incorporated herein by reference. The third component of the interpolymer in the binder latex comprises a minor amount of an unsaturated silane co-monomer. This co-monomer can generally correspond to a substituted silane of the structural Formula I:

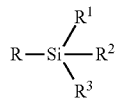

in which R denotes an organic radical olefinically unsaturated in the ω-position and $R^1$, $R^2$ and $R^3$ which may be identical or different, denote halogen, preferably chlorine, or the group —OZ, Z denoting hydrogen or primary or secondary alkyl or acyl radicals optionally substituted by alkoxy groups.

Suitable unsaturated silane compounds of the Formula I are preferably those in which the radical R in the formula represents an w-unsaturated alkenyl of 2 to 10 carbon atoms, particularly of 2 to 4 carbon atoms, or an w-unsaturated carboxylic acid ester formed from unsaturated carboxylic acids of up to 4 carbon atoms and alcohols carrying the Si group of up to 6 carbon atoms. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include vinyltrichlorosilane, vinylmethyldichlorosilane, γ-methacryloxypropyltris(2-methoxyethoxy)silane, vinylmethoxysilane, vinyltrimethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Another group of cross-linking co-monomers is composed of ethylenically unsaturated monomers containing epoxy groups, such as, for example, allyl glycidyl ether, methacryloyl glycidyl ether, butadiene monoepoxides, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxypropyl)acrylamide, N-(2,3-epoxypropyl)methacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidyloxymethylacrylamide, N-glycidyloxypropylmethacrylamide, N-glycidyloxyethylacrylamide, N-glycidyloxyethylmethacrylamide, N-glycidyloxypropylacrylamide, N-glycidyloxypropylmethacrylamide, N-glycidyloxybutylacrylamide, N-glycidyloxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl(2,3-epoxypropyl)ammonium chloride, methacrylamidopropyldimethyl(2,3-epoxypropyl) ammonium chloride, and glycidyl methacrylate.

The aforementioned cross-linking co-monomers will be generally present in the first copolymer, if at all, in an amount from 0.05 pphm to 5 pphm, e.g., 0.05 to 1 pphm or from 0.05 pphm to 0.5 pphm. More preferably, such polyethylenically unsaturated co-monomer(s)/cross-linker(s) will be used in the first copolymer, if at all, in amounts from 0.1 pphm to 0.3 pphm.

Since they are preferably formed in separate dispersions and then blended together, the first copolymer preferably is not intimately mixed with the second copolymer and preferably is not crosslinked therewith. Thus, to the extent a crosslinker is employed in the first copolymer, it is preferred that such crosslinker acts to crosslink the first copolymer with itself, but does not act to crosslink the first copolymer with the second copolymer.

In one embodiment, the second copolymer in the second dispersion and in the resulting blended latex dispersion of the invention is a copolymer of styrene and butadiene, e.g., styrene-butadiene copolymer (SB). Optionally, the second copolymer is a copolymer of styrene, butadiene and a third co-monomer, e.g., acrylonitrile (SBA). In another embodiment, the second copolymer in the second dispersion and in the resulting blended latex dispersion is a copolymer of styrene and an acrylic, e.g., a styrene-acrylic copolymer (SA). As used herein, the term "acrylic" refers to acids and esters (acrylates) having an acrylic group. A non-limiting list of exemplary SA copolymers includes: styrene/acrylic acid copolymer, styrene/methyl methacrylate copolymer and styrene/acrylonitrile copolymer. As used herein, SA copolymers include copolymers of styrene and acrylic esters and may include, for example, styrene/butyl acrylate copolymer, styrene/2-ethyl hexyl acrylate copolymer, and styrene/ethyl acrylate copolymer. Optionally, the SA copolymer is a copolymer of styrene, an acrylic co-monomer and a third co-monomer, e.g., a styrene/acrylic/acrylonitrile copolymer such as styrene/butyl acrylate/acrylonitrile copolymer. Thus, as used herein, the term styrene-acrylic copolymer or SA copolymer means copolymers comprising styrene monomer units, and acrylic monomer units and optionally one or more additional comonomer units.

As described above with respect to the first copolymer, the second copolymer optionally further comprises a co-monomer that acts as an internal crosslinker. For example, the second copolymer optionally further comprises a polyethylenically unsaturated co-monomer selected from the group consisting of triallyl cyanurate, triallyl isocyanurate, diallyl maleate, diallyl fumarate, divinyl benzene and diallyl phthalate. Preferred co-monomers of this type included diallyl maleate, diallyl fumarate and diallyl phthalate. This type of polyethylenically unsaturated co-monomer will be generally present in the second copolymer, if at all, in an amount from 0.05 pphm to 5 pphm, e.g., from 0.05 to 1 pphm or from 0.05 pphm to 0.5 pphm. More preferably, such polyethylenically unsaturated co-monomer(s)/cross-linker(s) will be used in the second copolymer, if at all, in amounts from 0.1 pphm to 0.3 pphm.

In one aspect, the latex dispersion and resulting coating composition of the invention comprises one or more external crosslinkers. Suitable external crosslinkers include carbonates such as ammonium zirconium carbonate (AZC) and potassium zirconium carbonate (KZC). The external crosslinker may be added to the first dispersion, the second dispersion, or to both the first and second dispersions, optionally before or after blending of the first and second dispersions. If present, the external crosslinker may be present in the blended dispersion in an amount from 1 to 10 wt. %, e.g., from 3 to 10 wt. %, based on the total weight of the blended dispersion.

The second copolymer preferably is not intimately mixed with the first copolymer, although it is contemplated that the external crosslinker, if present, may effectively crosslink carboxyl groups on the first copolymer with carboxyl group on the second copolymer. To the extent that internal crosslinkers are employed, it is preferred that such crosslinkers act to crosslink the first copolymer with itself and/or the second copolymer with itself, but do not act to internally crosslink the first copolymer with the second copolymer. In one embodiment, both the first and second copolymers, respectively, include internal crosslinkers, which may be the same or different type of crosslinker, but such crosslinkers do not internally crosslink the first copolymer with the second copolymer. In another embodiment, the first and second dispersions and the resulting blended latex of the invention are substantially free of internal and/or external crosslinkers.

As noted, the first and second copolymers used to form the latex dispersions of the coating compositions described herein are preferably made separately in a first dispersion and a second dispersion, respectively, which are blended together to form the inventive latex dispersion. Preferably, the co-monomers to the first copolymer and the co-monomers to the second copolymer will be present in amounts relative to each other to impart to the blended latex dispersion and in the coating composition containing the blended dispersion, e.g., paper coating composition, as hereinafter described, an IGT Dry Pick Value (also as defined hereinafter) of at least 250, at least 300, at least 350, at least 400, at least 463, or at least 500. Since IGT values may vary based on conditions employed, IGT dry values may also be expressed as a percentage (% IGT) of a control IGT value. For purposes of the present invention, the control IGT value is an equivalent IGT value determined based on the (non-blended) second dispersion employed. Although % IGT dry value may vary, according to some exemplary embodiments, % IGT Dry Pick Value may be greater than 70%, greater than 80%, greater than 90%, greater than 100% or greater than 110%. In terms of ranges, the % IGT Dry Pick Value may range from 70-110%, from 70-100%, from 80-97% or from 90-97%.

The first and second dispersions containing the first and second copolymers, respectively, can be prepared using conventional emulsion polymerization procedures. Such procedures are described in general, for example, in U.S. Pat. No. 5,849,389, the entirety of which is incorporated herein by reference, as well as in Chorng-Shyan Chem, *Principles and Applications of Emulsion Polymerization*, John Wiley and Sons Inc. (2008), the entirety of which is incorporated herein by reference.

In forming the first and second dispersions, the respective monomers can be polymerized in an aqueous medium under pressures not exceeding 100 atmospheres in the presence of a catalyst and at least one emulsifying agent. For either dispersion, the aqueous system can be maintained by a suitable buffering agent at a pH from 2 to 6 or from 4 to 6, with the catalyst being added incrementally or continuously. For the first dispersion, vinyl acetate and 50% to 75% of the other co-monomers, if any, can be suspended in water and thoroughly agitated in the presence of ethylene under the working pressure to effect solution of the ethylene in the mixture up to the substantial limit of its solubility under the conditions existing in the reaction zone. The vinyl acetate and other optional co-monomers can then be gradually heated to polymerization temperature. Preferably, either or both the first dispersion and/or the second dispersion or the resulting blended latex of the invention are free of, or are substantially free of, colloidal stabilizers such as polyvinyl alcohol, optionally comprising less than 1.5 pphm polyvinyl alcohol, less than 1 pphm polyvinyl alcohol, or less than 0.5 pphm polyvinyl alcohol, or optionally less than 1 wt. % polyvinyl alcohol, or less than 0.5 wt. % polyvinyl alcohol, based on the total weight of the monomers.

The homogenization period is generally followed by a polymerization period during which the catalyst, which comprises a main catalyst or initiator, and may include an activator, is added incrementally or continuously together with the remaining co-monomers, if any. The monomers employed may be added either as pure monomers or as a premixed dispersion.

Suitable polymerization catalysts include the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01% and 3% by weight, preferably 0.01% and 1% by weight, based on the total amount of the dispersion. They can be used together with reducing agents such as sodium formaldehyde-sulfoxylate, ferrous salts, sodium dithionite, sodium hydrogen sulfite, sodium sulfite, sodium thiosulfate, as redox catalysts in amounts of 0.01% to 3% by weight, preferably 0.01% to 1% by weight, based on the total amount of the dispersion. The free-radical-formers can be charged in the aqueous emulsifier solution or can be added during the polymerization in doses.

The manner of combining the polymerization ingredients can be by various known monomer feed methods, such as, continuous monomer addition, incremental monomer addition, or addition in a single charge of the entire amounts of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

The emulsion polymerization processes used to prepare the first and second dispersions in aqueous latex form is carried out in the presence of a stabilization system which comprises one or more of certain types of anionic and/or nonionic surfactants as emulsifiers. Such emulsifiers are conventional and well known.

Suitable nonionic surfactants which can be used as emulsifiers in the emulsion stabilizing system of the coating compositions herein include polyoxyethylene condensates. As noted above, however, such ethoxylated nonionic surfactants used to stabilize the binder dispersions of the present invention preferably do not include ethoxylated nonionics based on alkyl phenols. Exemplary polyoxyethylene condensates that can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

Nonionic surfactants that can be used also include a series of surface active agents available from BASF under the Pluronic™ and Tetronic™ trade names. Pluronic surfactants are ethylene oxide (EO)/Propylene oxide (PO)/ethylene oxide block copolymers that are prepared by the controlled addition of PO to the two hydroxyl groups of propylene glycol. EO is then added to sandwich this hydrophobe between two hydrophilic groups, controlled by length to constitute from 10% to 80% (w/w) of the final molecule. Pluronic surfactants are PO/EO/PO block copolymers prepared by adding EO to ethylene glycol to provide a hydrophile of designated molecular weight. PO is then added to obtain hydrophobic blocks on the outside of the molecule. Tetronic surfactants are tetra-functional block copolymers derived from the sequential addition of PO and EO to ethylene-diamine. Tetronic surfactants are produced by the sequential addition of EO and PO to ethylene-diamine. In addition, a series of ethylene oxide adducts of acetyleneic glycols, sold commercially by Air Products under the Surfynol™ trade name, are suitable as nonionic surfactants.

The binder dispersions and coating compositions described herein optionally are substantially free of alkylphenol ethoxylates (APEs). For purposes of this invention, such dispersions and coating compositions are considered to be substantially free of APEs if they contain less than 500 wppm of APEs. In other embodiments, the dispersion, e.g., either the first dispersion, the second dispersion, or the resulting blended latex dispersion of the invention may comprise a minor amount of APEs.

Suitable anionic surfactants that can be used as emulsifiers in the binder latex components of the coating compositions, e.g., paper coating compositions, described herein include alkyl aryl sulfonates, alkali metal alkyl sulfates, sulfonated alkyl esters and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl sulfosuccinate and dioctyl sodiumsulfosuccinate. The surfactants are employed in amounts effective to achieve adequate emulsification of the polymer in the aqueous phase and to provide desired particle size and particle size distribution. Other ingredients known in the art to be useful for various specific purposes in emulsion polymerization, such as, acids, salts, chain transfer agents, and chelating agents, also may be employed in the preparation of the polymer. For example, if the polymerizable constituents include a monoethylenically unsaturated carboxylic acid monomer, polymerization under acidic conditions (pH 2 to 7, preferably 2 to 5) is preferred. In such instances the aqueous medium can include those known weak acids and their salts that are commonly used to provide a buffered system at the desired pH range. Following polymerization, the solids content of the resulting first and second dispersions can be adjusted to the level desired by the addition of water or by the removal of water by distillation. Generally, for both the first and second dispersion, the desired level of polymeric solids content is from 40 to 70 weight percent, based on the total weight of the respective dispersion, from 40 to 60 weight percent or from 45 to 55 weight percent.

The particle size of the first and second dispersion, or the resulting blend of the two dispersions, can be regulated by the quantity of non-ionic or anionic surfactants employed. To obtain smaller particles sizes, greater amounts of surfactants are used. As a general rule, the greater the amount of the surfactant employed, the smaller the average particle size.

Processes for manufacturing the second dispersion prior to blending may vary depending on whether the second polymer is SB, SBA or SA. SB dispersions, SBA dispersions, and SA dispersions may be formed through well-known emulsion polymerization techniques, exemplary processes for which are disclosed, for example, in U.S. Pat. Nos. 5,288,787; 5,326,853; 5,362,798; 6,365,647; 6,432,269; 6,734,232, the entireties of which are incorporated herein by reference.

The raw materials used to form the second dispersion, for example, typically include the monomers (styrene and butadiene for SB; styrene, butadiene and acrylonitrile for SBA; and styrene and an acrylic monomer for SA), water, an emulsifier, an initiator system, a modifier, a free radical scavenger (e.g., dimethyl dithiocarbamate or diethyl hydroxylamine) and a stabilizer system. The polymerization process may be performed batch wise or continuously. In a continuous process, the monomers are metered into the reactor chains and emulsified with the emulsifiers and catalyst. The initiator system may be a redox reaction between, for example, chelated iron and an organic peroxide using a reducing agent, e.g., sodium formaldehyde sulfoxide (SFS). Alternatively, potassium peroxydisulfate may be used as the initiator. The process may be conducted as a cold polymerization process or a hot polymerization process. A mercaptan chain transfer agent may be used to provide free radicals and to control molecular weight distribution. During polymerization, the reaction conditions, e.g., temperature, flow rate, and agitation may be controlled to provide the desired level of conversion.

The relative amount of monomers for the second dispersion also may vary. In embodiments where the second polymer is SB, styrene may be present, for example, in an amount from 5 to 50 pphm, from 10 to 40 pphm, from 20 to 30 pphm, or from 20 to 80 pphm, and butadiene may be present in an amount from 50 to 95 pphm, from 60 to 90 pphm, from 70 to 80 pphm or from 20 to 80 pphm, based on the total monomer in the second dispersion. Other functional co-monomers that add carboxylate or other functionality, may be incorporated into the SB structure during formation of the second polymer. Exemplary functional co-monomers include acrylic acid, methacrylic acid, itaconic acid, and fumaric acid, among others well known to those skilled in the art.

Where the second polymer is SBA, the styrene may be present, for example, in an amount from 20 to 75 pphm, from 30 to 70 pphm, from 40 to 60 pphm, or from 45 to 55 pphm, the butadiene may be present in an amount from 1 to 40 pphm, from 20 to 75, from 5 to 30 pphm, or from 10 to 25 pphm, and the acrylonitrile may be present in an amount from 5 to 45 pphm, from 15 to 35 pphm, from 1 to 25 pphm, or from 20 to 30 pphm, all based on the total monomer in the second dispersion. For further description of SBA and processes for manufacturing SBA, see Harper C. A., *Handbook of Plastic and Elastomers*, McGraw-Hill, New York (1975), the entirety of which is incorporated herein by reference.

Where the second polymer is SA, the styrene may be present, for example, in an amount from 5 to 50 pphm, from 10 to 40 pphm, from 20 to 30 pphm, or from 20 to 80 pphm, and the acrylic monomer may be present in an amount from 50 to 95 pphm, from 60 to 90 pphm, from 70 to 80 pphm, or from 20 to 80 pphm, based on the total monomer in the second dispersion. Exemplary acrylic monomers and esters thereof include acrylic acid, methacrylic acid, itaconic acid, fumaric acid, acrylonitrile, butyl acrylate, 2-ethyl hexyl acrylate, and ethyl acrylate.

The actual paper coating compositions of the invention comprise the blended latex dispersion together with a pigment, such as kaolin clay, titanium dioxide and/or calcium carbonate, and the usual paper coating additives, which may include, for example, rheology modifiers such as CMC, sodium polyacrylates or sodium alginates; lubricants; crosslinkers; optical brighteners; biocides; dispersants; or other co-binders, such as polyvinyl alcohol, protein, e.g., casein or soy protein, or starch, as is well known to those skilled in the art. The coating compositions herein may also contain sufficient alkali to maintain the pH of the coating composition between 6 and 10, more preferably between 7 and 9.

Thus, in another embodiment, the invention is directed to a coating composition, preferably a paint, paper or paperboard coating composition, comprising an aqueous surfactant-stabilized, copolymer latex binder, and sufficient alkali to achieve a pH of 6 to 10, the latex binder having dispersed therein a first copolymer of an alkanoic acid having from 1 to 13 carbon atoms and ethylene, and a second copolymer of (i)

styrene and butadiene (SB), (ii) styrene, butadiene and acrylonitrile (SBA), or (iii) styrene and an acrylic monomer (SA), wherein the latex binder is stabilized with anionic and/or non-ionic emulsifiers. The coating composition preferably further comprises one or more pigments. Preferably, the latex binder is formed as a blend of a first dispersion comprising VAE copolymer and a second dispersion comprising SB, SBA or SA copolymer, as described above. The composition preferably is substantially free of alkyl phenol ethoxylate surfactants and protective colloids such as polyvinyl alcohol, as described above.

The pigment used in the paper coating compositions herein may be any of those conventionally employed. Frequently, some or all of the pigment comprises clay and for this portion any of the clays customarily used for paper coating, including the hydrous aluminum silicates of kaolin group clays, hydrated silica clays, and the specific types of clays recommended in Chapters 10-16 of "Kaolin Clays and their Industrial Uses," by J. M. Huber Corp. (1949), New York, N.Y. may be employed.

In addition to clay itself, or as a complete replacement for clay, paper pigments may also be utilized, such as, for example, calcium carbonate, titanium dioxide, or other coating pigments including plastic pigments, for example, polystyrene. The pigments, in particular calcium carbonate, optionally may be present, for example, in amounts up to 50 wt. %, up to 75 wt. % or up to 97 wt. %, based on the total weight of the coating composition. Additionally, the composition may also contain other additives such as zinc oxide and/or a small amount of a dispersing or stabilizing agent such as sodium polyacrylate or tetrasodium polyphosphate (TSPP). The amount of binder (dispersion blend) in the paper coating composition may vary, but optionally ranges from 2.5 to 25 parts per 100 parts dry pigment, e.g., from 3.5 to 18 parts per 100 parts dry pigment. Optical brighteners may also be employed in the coating composition.

The composition of the pigments in the paper coating composition may vary widely. In one embodiment, the pigment consists of calcium carbonate. In some other embodiments, the coating composition comprises from 65 to 100 wt. % clay, from 0 to 35 wt. % secondary pigment, from 0.01 to 0.5 wt. % stabilizing agent; from 3 to 30 wt. % interpolymer latex (solids basis); from 0 to 25 wt. % cobinder; from 0 to 0.2 wt. % defoamer; and sufficient water to provide the desired level of solids. Coating compositions containing from 40 wt % to 70 wt % solids are typical. The modification and formulation of the coating color using these materials will be within the knowledge of those skilled in the art.

The paper coating compositions of the invention may be applied to various substrates including paper such as freesheet and groundwood grades; Paperboard; labels; paper products used for newspapers, advertisements, poster, books or magazines; and building substrates such as wall paper, wall board, or ceiling tile. The paper coating composition also can be used to coat paper intended for offset or rotogravure printing.

The amount of the paper coating composition applied to the substrate is generally in the range of 1 g/m$^2$ to 30 g/m$^2$, and optionally in the range of 3 g/m$^2$ to 12 g/m$^2$ or from 15 to 25 g/m$^2$. The paper coating composition may be applied in a single step or by using two or more steps to build the final coat weight. Further, the paper coating composition may also be applied to the second side of the substrate either simultaneously or as a separate coating step.

The paper coating composition may be applied to the substrate by techniques well known to those in the art. For example, the paper coating composition may be applied with a roll applicator such as a metered size press; a blade coater such as a short dwell time applicator; air knife coater; slot die coater; jet applicator; or brush. Preferred coating methods for high speed application include the use of a blade coater or a metered size press.

The paper coating compositions of the present invention, which contain the particular blended latex dispersions described herein, provide highly desirable binding characteristics when applied as coating to paper substrates of the type described above. The binding performance can be quantified by means of a parameter called dry pick strength, and in particular by means of parameters known in the industry as Dry Pick Values as specifically defined hereinafter.

"Picking" is defined as the lifting of a coating, film or fibers from the surface of the base paper during printing. When a print wheel makes contact with a paper sample to deposit the ink, then subsequent negative forces are exerted on the paper as the inked print wheel is removed from the paper surface. The dry pick strength of the coated paper is measured with a method that consists of printing a strip of the coated paper in a print tester at an accelerating rate. The accelerated speed of the print wheel and the tack rating of the ink are adjusted to determine the strength of the coated paper sample at specific printing conditions. If the combination of print wheel speed and ink tack is great enough, then resulting negative forces create picking, which may appear as: white areas on the surfaces of the print wheel and coated paper sample, as blisters and textured areas on the surface of the coated paper sample, as delamination (surface layer removal) of the coated paper sample, or as tearing (complete strength failure) of the base paper sample.

As noted above, the paper coating compositions of the present invention, when using the blended latex dispersions of the present invention, preferably will exhibit Dry IGT Pick Values of at least 250, at least 300, at least 350, at least 400, at least 463, or at least 500, with crosslinker or substantially free of crosslinker. Generally, the paper coating compositions of the present invention preferably exhibit Dry IGT Pick Values from 250 to 600, e.g., from 350 to 600, from 400 to 600, from 450 to 550, with crosslinker or substantially free of crosslinker.

Since pick strength values may vary based on the substrate used, pick strength may also be determined relative to a control. As used herein, "% IGT" refers to such values relative to control based on a (non-blended) second dispersion. According to preferred embodiments, the % IGT dry pick value may be greater than 70%, greater than 80%, greater than 90%, greater than 100% or greater than 110%. In terms of ranges, the % IGT Dry Pick Value may range from 70 to 110%, from 70 to 100%, from 80 to 97% or from 90 to 97%.

In addition to Pick Values, the dispersions and coating compositions of the invention preferably are suited to provide good ink transfer properties, as determined by the Simultaneous Ink and Water Absorption (SIWA) Test, described below. The paper coating compositions of the present invention, when using the blended latex dispersions of the present invention, preferably will exhibit a SIWA % Ink Transfer Value greater than 45% ink transfer, e.g., greater than 90% ink transfer, with crosslinker or substantially free of crosslinker. In terms of ranges, the paper coating compositions of the present invention preferably exhibit a SIWA % Ink Transfer Value from 45 to 99%, e.g., from 70 to 97% or from 90 to 97%, with crosslinker or substantially free of crosslinker.

The paper coating compositions of the invention also preferably provide desirable brightness characteristics. In some exemplary embodiments, binders and paper coating compositions of the invention provide a TAPPI T452 brightness value of at least 70, at least 79, at least 87, or at least 90, or in terms of ranges, from 70 to 97, from 70 to 90, from 75 to 85 or from 85 to 90.

The paper coating compositions of the present invention also preferably have a high degree of gloss. In some exemplary embodiments, binders and paper coating compositions of the invention provide a TAP PI T480 gloss value of at least 30, at least 35 or at least 40, or in terms of ranges, from 30 to 60, from 30 to 50 or from 35 to 45.

In addition, the paper coating compositions of the present invention preferably are very smooth (have a low degree of roughness). In some exemplary embodiments, the binders and paper coating compositions of the invention provide a TAPPI T555 roughness value of less than 3.2, less than 3.0, less than 2.8, or less than 2.5, or in terms of ranges, from 1.3 to 3.2, from 1.5 to 3.2, from 2.0 to 3.0 or from 2.2 to 2.8, although other roughness values may also be possible depending on the substrate employed. For example, in one aspect the coating is employed on paper and the coating has a roughness value less than 1.75, less than 1.5 or less than 1.4. The T555 roughness preferably is less with a substrate coated with the blended coating composition according to the invention than with a comparable VAE coating (without second copolymer). In some embodiments, surface roughness may be reduced relative to such a comparison coating composition by at least 10%, at least 25% or at least 50%.

Depending on the formulation employed, the binder and paper-coating compositions of the present invention may or may not comply with U.S. Food & Drug Administration (FDA) regulations concerning paper products that can be used in contact with food. In particular, FDA regulations embodied in 21 CFR §176.170 and 21 CFR §176.180 indicate the types of paper coating composition components, including components of polymers used in such compositions, which can be utilized to coat paper for eventual use with food products.

EXAMPLES

The latex dispersions of the present invention, and the performance of such dispersions in the paper coating compositions herein, are illustrated by way of the following non-limiting Examples.

Testing Parameters

In the Examples, various VAE blends were formulated and tested for IGT Pick Strength, Roughness, Gloss, SIWA value and Brightness. The testing parameters employed for these tests are provided below.

IGT Pick Strength

Evaluation of the picking effect exhibited by selected paper substrates coated with any given type of paper coating composition can be used to quantify the binding strength and coating performance of that composition. Picking evaluation is carried out by means of IGT pick testing according to standard methods of measurement by the Technical Association of the Pulp and Paper Industry (TAPPI) as well known in the art. A measure of dry binding strength is provided by IGT Pick testing pursuant to TAPPI Useful Method UM 591, Surface Strength of Paper, the entirety of which is incorporated herein by reference. The IGT dry pick strength measures the speed, in cm/sec, required to lift the paper coating off of the surface of a paper substrate strip when printed using an ink roller and standard conditions as described in UM 591. Higher IGT dry pick numbers indicate better resistance of the coated substrate to picking and hence higher strength coating performance.

The IGT Dry Pick Values in the Examples were obtained at 5 cm/sec, and 50 KgF. Some variation in pick conditions may be employed depending on the substrate employed and coating composition, among other factors, as will be appreciated by those skilled in the art, in order to have conditions effective to perform the pick test. IGT testing is an average of seven different test strips taken from different substrates, e.g., different paperboards.

Roughness

Roughness may be measured according to TAPPI T555 om-04 (Parker roughness), the entirety of which is incorporated herein by reference. The T555 standard simulates printing press conditions. The instrument contains an internal gas flow restrictor with closely controlled pressure drop versus flow characteristics. The air flow over the surface of the paper or paperboard is calculated by comparing the pressure drop across the measuring head and the paper test surface with that across the flow restrictor. Roughness values are averaged over 20 readings from four different substrates, e.g., four different paperboard substrates of the same type.

Gloss

Gloss may be measured using the TAPPI T480 om-05 standard entitled "Specular gloss of paper and paperboard at 75 degrees," the entirety of which is incorporated herein by reference. The T480 standard involves the measuring for specular gloss with a glossmeter at 75° C. and at an angle of 15° from the plane of the paper. Gloss values were averaged over 20 readings from four different substrates (paperboards).

Simultaneous Ink & Water Absorption (SIWA)

In the SIWA test, run on the IGT unit, cyan ink is applied to an aluminum inking disk. Just prior to printing the sample, a 4 microliter drop of water is applied to the inked disk and the printing is completed. After printing, the sample is left for at least 30 minutes, and measurements are taken of the ink density in the area printed over the water and the area where no water was present. The density in the water area is then subtracted from the density in the area where no water was present. This difference is divided by the density where no water was printed to provide a percent ink transfer value. The lower the % ink transfer in the test, the more the water interfered with the printing. Thus, greater ink transfer values are preferred.

Brightness

Brightness is measured by the TAPPI Brightness standard T452, "Brightness of pulp paper and paperboard (directional reflectance at 457 nm)," the entirety of which is incorporated herein by reference. In this test, a specifically designed directional geometry brightness tester is employed. A brightness filter is employed such that the values measured by the instrument will match those on a set of opal glass and paper standards within set tolerances. The brightness may be reported as a percentage of how much light is reflected. Thus, greater brightness values represent a brighter or whiter coated paper. Brightness values were averaged over 20 readings from four different substrates (paperboards).

Paper Coating Composition Formulations

In the Examples, paper coating compositions were formulated comprising blends of one of four types of anionic and/or non-ionic surfactant-stabilized VAE dispersions, described in Table 1, and a second polymer selected from SB, SA, styrene/butyl acrylate/acrylonitrile, and SBA copolymers. The first copolymers were epoxy functionalized, carboxyl functionalized, silane functionalized, or a combination thereof, as shown in Table 1.

TABLE 1

VAE DISPERSIONS USED IN EXAMPLES 1-64

| Polymer | VA:C$_2$H$_4$ (pphm) | Functionality | Particle Size (nm) | Tg (°C.) | [PVOH] (pphm) | Surfactant |
|---|---|---|---|---|---|---|
| VAE 1 | 86:14 | Epoxy | 220 | 10 | 0 | Anionic |
| VAE 2 | 86:14 | Carboxylated | 180 | 10 | 0 | Anionic |
| VAE 3 | 87:13 | Silane | 280 | 9 | 0.2 | Anionic, Non-ionic |
| VAE 4[1] | 80:20 | Multi-functional | 220 | 0 | 0 | Anionic, Non-ionic |

[1]VAE 4 was formed as described in Ex. 10 of commonly owned WO 2012/012231, the entirety of which is incorporated herein by reference.

Examples 1-13

SB Blends on Paperboard

For Examples 1-13, the coating formulation used to treat the paperboard substrate was formulated as follows (expressed per 100 parts dry pigment):

TABLE 2

COATING FORMULATION EXAMPLES 1-13

100 parts No. 1 Clay
0.1 parts FinnFix 10 CMC (carboxymethylcellulose)
0.1 parts Dispex N40V (sodium polyacrylate pigment dispersant)
17 parts Test Binder
Composition pH adjusted to 8.5 w/ NH$_4$OH:H$_2$O (1:1) solution
64% target solid The binder level in this formulation was selected to emulate commercial coating recipes. For Examples 1-13, wire wound rods were used to coat the bleached board at a target coating weight value of 12 lbs./3000 ft$^2$ (19.5 g/m$^2$). This coating weight was selected to mimic the bleached board market. The freshly coated boards were oven dried at 260° F. (127° C.) for 30 seconds and subsequently calendered at 600 psi (4137 kPa) and 170° F. (77° C.) using 1 nip. The finished boards were allowed to sit for 24 hours under constant temperature and humidity conditions (72° F. (22° C.), 50% relative humidity) before being tested.

The comparative VAE dispersion composition did not contain a second copolymer, i.e., SB, SBA or SA. Examples 2-4 included various blended latex dispersions comprising VAE and SB copolymers in the relative amounts (wt. % based on total solids) indicated in Table 3. The coating composition of Comparative Example 5 was formed from a commercial SB dispersion and did not contain a first polymer, i.e., VAE. In each Example, the coating composition was tested for gloss, roughness and SIWA. The results are provided in Table 3.

TABLE 3

EXAMPLES 1-5

| Ex. | Samples | Gloss | Roughness | SIWA % Ink Transfer |
|---|---|---|---|---|
| 1 | VAE 4 (Comp) | 45.2 | 2.19 | 84.83 |
| 2 | 80% VAE 4 20% SB | 40.4 | 2.53 | 90.82 |
| 3 | 60% VAE 4 40% SB | 39.9 | 2.53 | 92.50 |
| 4 | 40% VAE 4 60% SB | 39.9 | 2.30 | 82.71 |
| 5 | SB (Comp) | 34.6 | 3.21 | 83.57 |

In Examples 6-13, additional blended formulations were prepared with and without crosslinker. Examples 6-9 were prepared without ammonium zirconium carbonate (AZC) as crosslinker and Examples 10-13 were prepared with AZC crosslinker (1.5 parts AZC for every 15 parts binder in the coating composition). The coating composition of Comparative Examples 6 and 10 were formed from VAE copolymer and did not contain the second copolymer, i.e., SB, SBA or SA. Examples 7, 8, 11 and 12 included various blended latex dispersions comprising VAE and SB copolymers in the relative amounts (wt. % based on total solids) indicated in Table 4. The coating composition used in Comparative Examples 9 and 13 were formed from an SB dispersion that did not contain a first polymer, i.e., VAE. In each Example, the coating composition was tested for gloss, roughness and SIWA. The results are provided in Table 4.

TABLE 4

EXAMPLES 6-13

| Ex. | Samples | Gloss | Roughness | SIWA % Ink Transfer |
|---|---|---|---|---|
| | | No AZC | | |
| 6 | VAE 4 (Comp.) | 36.0 | 2.60 | 43.26 |
| 7 | 90% VAE 4 10% SB | 38.3 | 2.58 | 58.06 |
| 8 | 20% VAE 4 80% SB | 44.8 | 2.87 | 62.74 |
| 9 | SB (Comp.) | 37.0 | 2.93 | 75.36 |
| | | With AZC | | |
| 10 | VAE 4 (Comp.) | 35.5 | 2.60 | 50.00 |
| 11 | 90% VAE 4 10% SB | 37.8 | 2.77 | 53.37 |
| 12 | 20% VAE 4 80% SB | 37.0 | 3.02 | 50.70 |
| 13 | SB (Comp.) | 38.5 | 2.76 | 54.87 |

As shown in Tables 3 and 4, the VAE/SB blends showed an unexpected improvement in gloss, roughness and SIWA Percent Ink Transfer Test in several test runs. The addition of the SB to the VAE increased the % ink transfer and therefore made a coated surface more desirable to both the papermaker and the printer. The data in Tables 3 and 4 indicate that blended latex binder dispersions based on VAE and SB, with or without crosslinker, can be used in paper coating compositions and provide especially desirable performance.

Binders having the requisite amount of the first copolymer (VAE) and second copolymer (e.g., SB) provide paper coating compositions which, in fact, compare favorably in performance to coating compositions containing VAE binders with high ethylene content as well as to coating compositions containing conventional styrene-based binders.

Examples 14-18

VAE, Styrene/Butyl Acrylate/Acrylonitrile Blends on Paper

In Examples 14-18, paper coating compositions comprising varying amounts of VAE 4 and a commercially available styrene/butyl acrylate/acrylonitrile dispersion were formulated and tested. The relative amounts of VAE 4 and second polymer used in the tested formulations are provided in Table 5.

Figure 2:
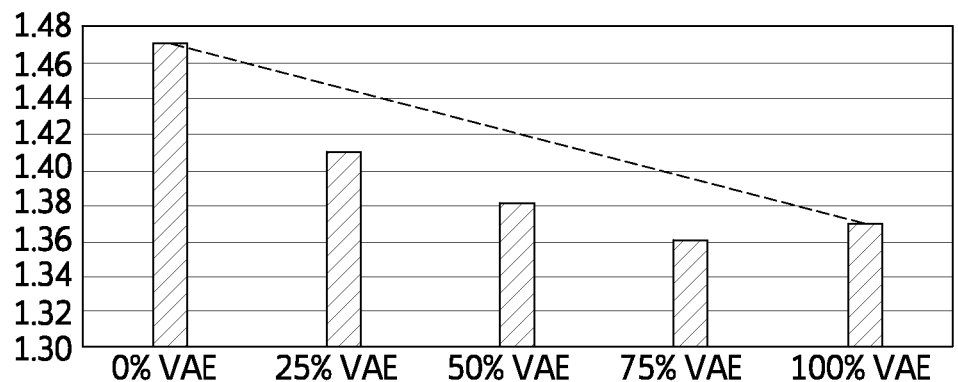
FIG. 2 is a graph showing improved (reduced) roughness observed in latex blends comprising VAE and styrene/butyl acrylate/acrylonitrile copolymers.

The paper coating compositions were applied to light weight coated (LWC) paper, calendered and tested for brightness according to TAPPI T-452 and Parker Print Roughness at 1000 kPa (lower values reflecting greater smoothness) according to TAPPI T-555. The formulations employed and resulting brightness and roughness values are provided in Table 5, below, and in FIGS. 1 and 2. As shown, the blended formulations were surprisingly brighter and smoother than expected values that were calculated based on comparison Example 14 (100% styrene/butyl acrylate/acrylonitrile-based formulation) and comparison Example 18 (100% VAE-based formulation).

TABLE 5

BRIGHTNESS AND ROUGHNESS RESULTS FOR EXAMPLES 14-18

| EXAMPLE | % VAE 4[1] | Tested Brightness | Expected Brightness | Tested Roughness | Expected Roughness |
|---|---|---|---|---|---|
| 14 (Comp.) | 0 | 86.82 | N/A | 1.47 | N/A |
| 15 | 25 | 87.00 | 86.93 | 1.41 | 1.45 |
| 16 | 50 | 87.08 | 87.04 | 1.38 | 1.42 |
| 17 | 75 | 87.22 | 87.15 | 1.36 | 1.40 |
| 18 (Comp.) | 100 | 87.26 | N/A | 1.37 | N/A |

[1]Remainder styrene/butyl acrylate/acrylonitrile second polymer

Examples 19-64

In Examples 19-64, paper coating compositions were formulated according to the formulation provided in Table 6.

TABLE 6

COATING FORMULATION EXAMPLES 19-64

| Dry parts | Trade Name | Description |
|---|---|---|
| 70 | Hydrocarb 60 | $CaCO_3$ |
| 30 | Ultrawhite 90 | Kaolin Clay |
| 0.1 | Finnfix 10G | CMC |
| 0.1 | Dispex | Dispersant |
| 17 | (Polymer) | See Tables 7-12 |

In these examples, wire wound rods were used to coat bleached board at a target coating weight value of 12 lbs./3000 ft² (19.5 g/m²). This coating weight was selected to mimic the bleached board market. The freshly coated boards were oven dried at 260° F. (127° C.) for 30 seconds and subsequently calendered at 550 psi (3792 kPa) and 200° F. (93° C.) using 1 nip. The finished boards were allowed to sit for 24 hours under constant temperature and humidity conditions (72° F. (22° C.), 50% relative humidity) before being tested.

Examples 19-22

VAE, SA Blends on Paperboard

In Examples 19-22, paper coating compositions were formulated and tested comprising varying amounts of VAE 4 and a commercially available SA dispersion (BASF Acronal® 728 styrene/butyl acrylate copolymer, Tg=23° C., TS=50%, pH=7, Avg. particle size=170 nm). The relative amounts of VAE copolymer and second polymer used in the tested formulations are provided in Table 7.

The paper coating compositions were rod coated to 5 SBS (Solid Bleached Sulfate) Paperboards using a K303 Multicoater and the appropriate Meyer rod to reach target coat weight of 12 lbs./3000 ft² (19.5 g/m²). Coated board were dried in a forced air oven for 30 seconds at 260° F. (127° C.). Coated boards were calendared using a Beloit Laboratory Calendar set at 200° F. (93° C.), 550 psi (3792 kPa), and 1 nip. Calendered boards were allowed to condition 24 hours in a 72° F. (22° C.)/50% RH conditioned room. Physical testing was performed under the environmentally controlled room.

Figure 3:
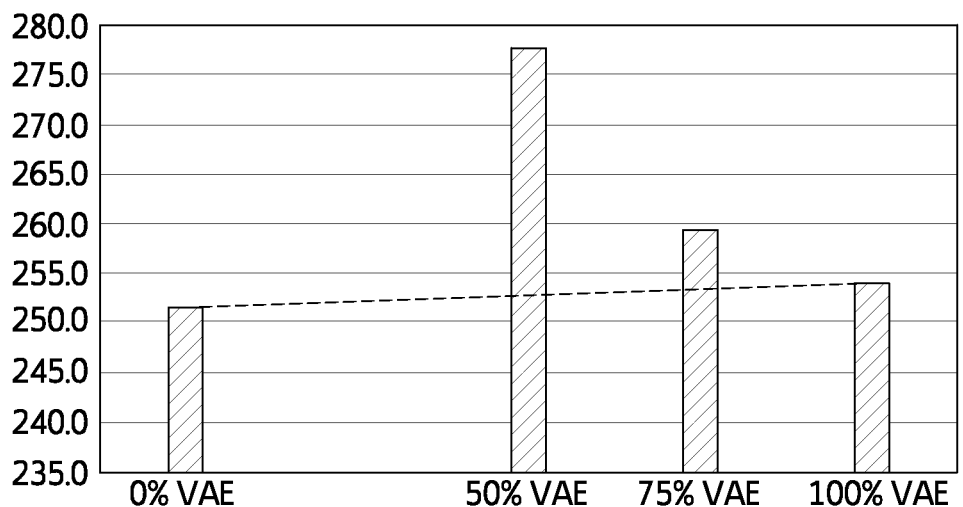
FIG. 3 is a graph showing improved dry IGT values observed in latex blends comprising VAE and styrene/butyl acrylate copolymers.
Figure 4:
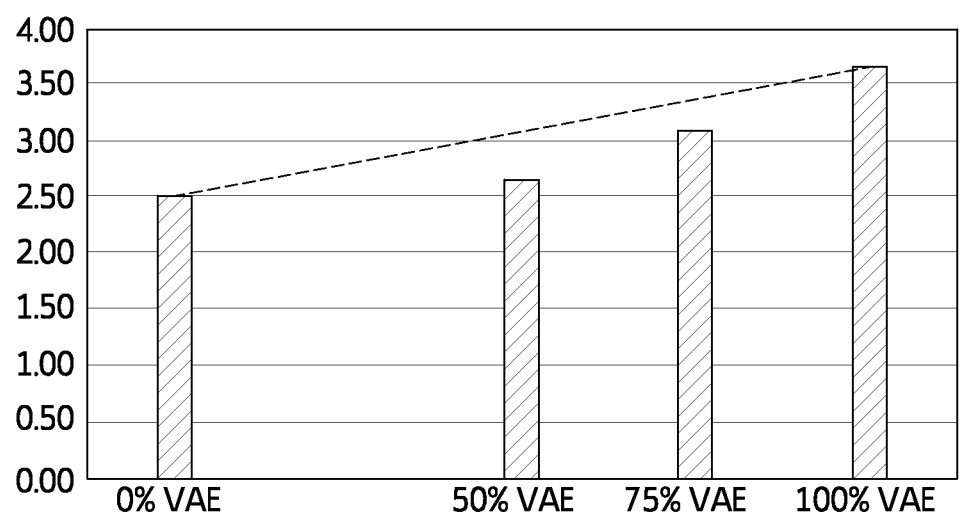
FIG. 4 is a graph showing improved roughness observed in latex blends comprising VAE and styrene/butyl acrylate copolymers.

The coated boards were tested for IGT dry pick strength and Parker Print Roughness (1000 kPa). The resulting IGT and Roughness values are provided in Table 7 and in FIGS. 3 and 4. As shown, the blended formulations exhibited surprisingly high IGT dry pick values that exceeded expected values calculated based on comparison Example 19 (100% styrene/butyl acrylate formulation) and comparison Example 22 (100% VAE formulation), and unexpectedly low roughness values when compared to Examples 19 and 22.

TABLE 7

IGT AND ROUGHNESS RESULTS FOR EXAMPLES 19-22

| EXAMPLE | % VAE 4[1] | Tested IGT (dry) | Expected IGT (dry) | Tested Roughness | Expected Roughness |
|---|---|---|---|---|---|
| 19 (Comp.) | 0 | 251.7 | N/A | 2.51 | N/A |
| 20 | 50 | 277.9 | 253.0 | 2.66 | 3.08 |
| 21 | 75 | 259.6 | 253.7 | 3.08 | 3.37 |
| 22 (Comp.) | 100 | 254.3 | N/A | 3.65[2] | N/A |

[1]Remainder styrene/butyl acrylate second polymer
[2]Roughness values in Example 22 differed from those shown in Example 18 due to the different substrates employed (paper vs. paperboard).

Examples 23-25

VAE, SB Blends on Paperboard

In Examples 23-25, paper coating compositions were formulated and tested comprising varying amounts of VAE 4 and a commercially available SB dispersion (Dow 620: 65/35 styrene/butadiene, TS=50%, pH=6, Avg. particle size=170 nm). The relative amounts of VAE copolymer and second polymer used in the tested formulations are provided in Table 8. The paper coating compositions were applied to paperboard as described above.

Examples 26-28

VAE, Styrene/Butyl Acrylate/Acrylonitrile Blends on Paperboard

In Examples 26-28, paper coating compositions were formulated and tested comprising varying amounts of VAE 4 and a commercially available Styrene/Butyl Acrylate/Acrylonitrile dispersion. The relative amounts of VAE copolymer and second polymer used in the tested formulations are provided in Table 8. The paper coating compositions were applied to paperboard as described above.

The coated boards prepared in Examples 19-28 were tested for gloss as described above and compared to boards coated with non-blended coating formulations. The resulting values are provided in Table 8. As shown, the blended formulations exhibited surprisingly high gloss values that exceeded expected values using 50/50 VAE/Second copolymer blends for each type of second copolymer. In view of this unexpected result, in applications where high gloss is desired, employing first copolymer to second copolymer molar ratios less than 3:1, e.g., less than 2:1, and approaching about 1:1 may be preferred. In terms of ranges, the first copolymer to second copolymer molar ratio may range from 0.1:1 to 3:1, e.g., from 0.25:1 to 2:1 or from 0.5:1 to 1.5:1 for high gloss applications.

TABLE 8

GLOSS RESULTS FOR EXAMPLES 19-28

| EXAMPLE | % VAE 4[1] | Tested Gloss | Expected Gloss |
|---|---|---|---|
| VAE, Styrene/Butyl Acrylate Blends | | | |
| 19 (Comp.) | 0 | 42.83 | N/A |
| 20 | 50 | 44.57 | 42.38 |
| 21 | 75 | 41.52 | 42.16 |
| 22 (Comp.) | 100 | 41.93 | N/A |
| VAE, SB Blends | | | |
| 23 (Comp.) | 0 | 39.57 | N/A |
| 24 | 50 | 42.52 | 40.75 |
| 25 | 75 | 40.57 | 41.34 |
| 22 (Comp.) | 100 | 41.93 | N/A |
| VAE, Styrene/Butyl Acrylate/Acrylonitrile Blends | | | |
| 26 (Comp.) | 0 | 49.93 | N/A |
| 27 | 50 | 46.92 | 45.93 |
| 28 | 75 | 43.79 | 43.93 |
| 22 (Comp.) | 100 | 41.93 | N/A |

[1]Remainder second polymer

Examples 29-41

Blends of Various VAE Copolymers with SA Copolymers on Paperboard

In Examples 29-41, paper coating compositions were formulated according to Table 6 and tested comprising varying amounts VAE 1, VAE 2 and VAE 3 and a commercially available SA dispersion (styrene/butyl acrylate copolymer (BASF Acronal® 728), Tg=23° C., TS=50%, pH=7, Avg. particle size=170 nm). The relative amounts of VAE copolymer and second polymer used in the tested formulations are provided in Table 9.

Figure 5:
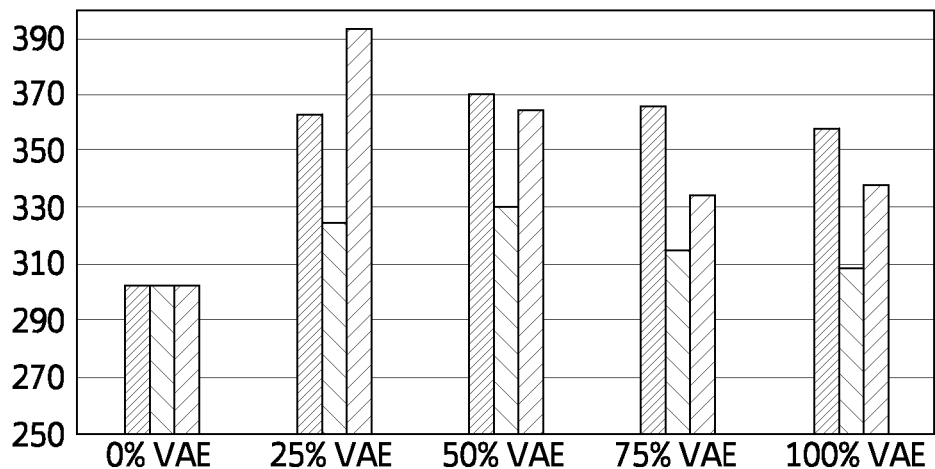
FIG. 5 is a graph showing improved dry IGT values observed in latex blends comprising various VAE copolymers and styrene/butyl acrylate copolymers.
Figure 6:
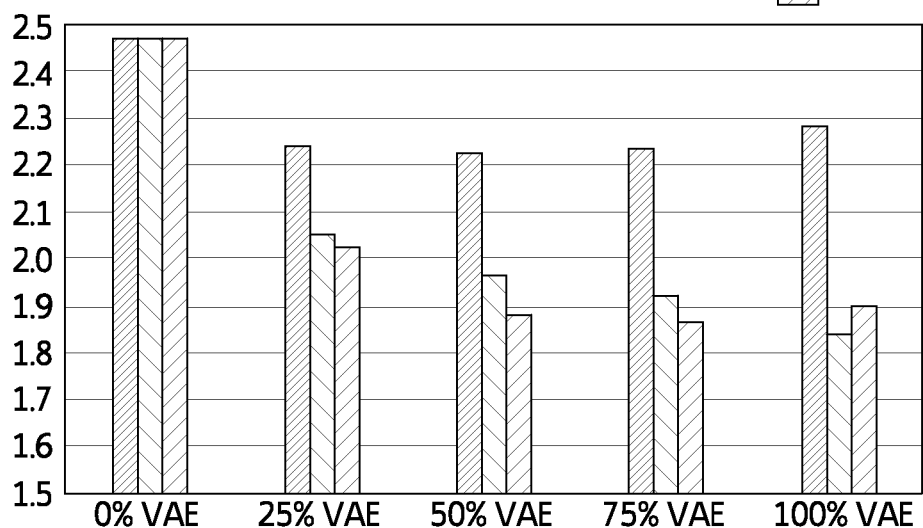
FIG. 6 is a graph showing improved roughness observed in latex blends comprising various VAE copolymers and styrene/butyl acrylate copolymers.

The coating compositions were applied to paperboard and tested for IGT dry pick strength and Parker Roughness (1000 kPa). The resulting IGT and roughness values are provided in Table 9 and in FIGS. 5 and 6. As shown, the blended formulations exhibited IGT dry pick values that surprisingly and unexpectedly exceeded all expected values calculated based on the comparison Examples in Table 9, and roughness values that were surprisingly and unexpectedly lower than all expected values.

TABLE 9

IGT AND ROUGHNESS VALUES FOR EXAMPLES 29-41

| EXAMPLE | | Tested IGT | Expected IGT | Tested Roughness | Expected Roughness |
|---|---|---|---|---|---|
| % VAE 1[1] | | | | | |
| 29 (Comp.) | 0 | 301.7 | N/A | 2.47 | N/A |
| 30 | 25 | 363.6 | 315.6 | 2.24 | 2.42 |
| 31 | 50 | 370.1 | 329.4 | 2.22 | 2.38 |
| 32 | 75 | 365.7 | 343.3 | 2.23 | 2.33 |
| 33 (Comp.) | 100 | 357.1 | N/A | 2.28 | N/A |
| % VAE 2[1] | | | | | |
| 29 (Comp.) | 0 | 301.7 | N/A | 2.47 | N/A |
| 34 | 25 | 324.6 | 303.3 | 2.05 | 2.31 |
| 35 | 50 | 329.3 | 304.9 | 1.96 | 2.16 |
| 36 | 75 | 314.6 | 306.5 | 1.92 | 2.00 |
| 37 (Comp.) | 100 | 308.1 | N/A | 1.84 | N/A |
| % VAE 3[1] | | | | | |
| 29 (Comp.) | 0 | 301.7 | N/A | 2.47 | N/A |
| 38 | 25 | 392.9 | 310.7 | 2.02 | 2.33 |
| 39 | 50 | 363.9 | 319.7 | 1.88 | 2.19 |
| 40 | 75 | 334.4 | 328.7 | 1.86 | 2.04 |
| 41 (Comp.) | 100 | 337.7 | N/A | 1.90 | N/A |

[1]Remainder styrene/butyl acrylate copolymer

Examples 42-54

Blends of Various VAE Copolymers with SB on Paperboard

In Examples 42-54, paper coating compositions were formulated according to Table 6 and tested comprising varying amounts VAE 1, VAE 2, and VAE 3 and a commercially available SB dispersion (Dow 620: 65/35 styrene/butadiene, TS=50%, pH=6, Avg. particle size=170 nm). The relative amounts of VAE copolymer and second polymer used in the tested formulations are provided in Table 10.

Figure 7:
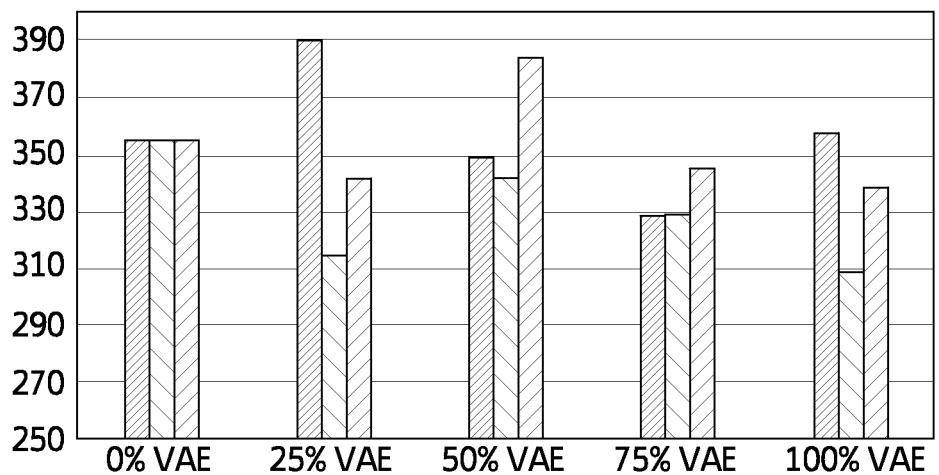
FIG. 7 is a graph showing improved dry IGT values observed in latex blends comprising various VAE copolymers and styrene/butadiene copolymers.
Figure 8:
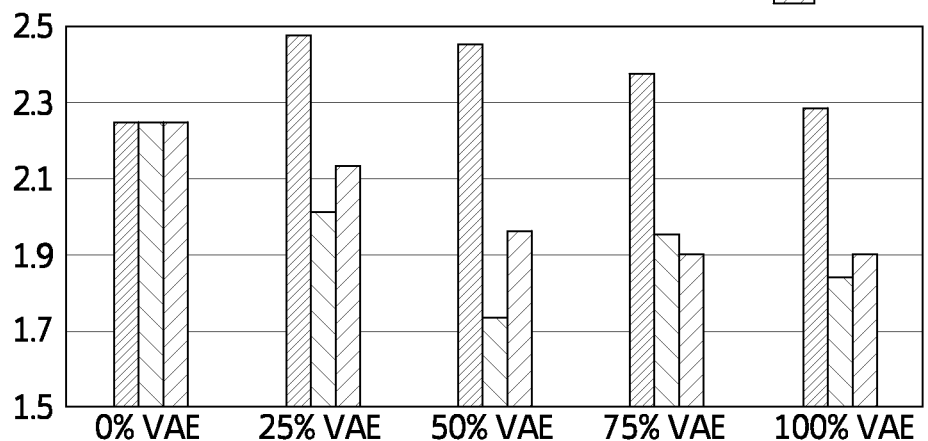
FIG. 8 is a graph showing improved roughness observed in latex blends comprising various VAE copolymers and styrene/butadiene copolymers.

The coating compositions were applied to paperboard and tested for IGT dry pick strength and Parker Roughness (1000 kPa). The resulting IGT and roughness values are provided in Table 10 and in FIGS. 7 and 8. As shown, several of the blended formulations exhibited IGT dry pick values that surprisingly and unexpectedly exceeded expected values calculated based on the comparison Examples in Table 10 and roughness values that were surprisingly and unexpectedly lower than expected values.

TABLE 10

IGT AND ROUGHNESS VALUES FOR EXAMPLES 42-54

| EXAMPLE | | Tested IGT | Expected IGT | Tested Roughness | Expected Roughness |
|---|---|---|---|---|---|
| % VAE 1[1] | | | | | |
| 42 (Comp.) | 0 | 353.9 | N/A | 2.25 | N/A |
| 43 | 25 | 389.4 | 354.7 | 2.47 | 2.26 |
| 44 | 50 | 348.2 | 355.5 | 2.45 | 2.27 |
| 45 | 75 | 327.2 | 356.3 | 2.37 | 2.27 |
| 46 (Comp.) | 100 | 357.1 | N/A | 2.28 | N/A |
| % VAE 2[1] | | | | | |
| 42 (Comp.) | 0 | 353.9 | N/A | 2.25 | N/A |
| 47 | 25 | 314.7 | 342.5 | 2.01 | 2.15 |
| 48 | 50 | 341.0 | 331.0 | 1.73 | 2.05 |
| 49 | 75 | 327.9 | 319.6 | 1.95 | 1.94 |
| 50 (Comp.) | 100 | 308.1 | N/A | 1.84 | N/A |
| % VAE 3[1] | | | | | |
| 42 (Comp.) | 0 | 353.9 | N/A | 2.25 | N/A |
| 51 | 25 | 341.0 | 349.9 | 2.13 | 2.16 |
| 52 | 50 | 383.0 | 345.8 | 1.96 | 2.08 |

TABLE 10-continued

IGT AND ROUGHNESS VALUES FOR EXAMPLES 42-54

| EXAMPLE | Tested IGT | Expected IGT | Tested Roughness | Expected Roughness |
|---|---|---|---|---|
| 53 | 75 | 344.3 | 1.90 | 1.99 |
| 54 (Comp.) | 100 | 337.7 | N/A | 1.90 | N/A |

[1]Remainder SB copolymer

Examples 55-59

VAE, SBA Blends on Paperboard

In Examples 55-59, paper coating compositions were formulated according to Table 6 and tested with blends of varying amounts of VAE 4 and a commercially available SBA dispersion (Omnova 9203, TS=50%, pH=7, Tg=13° C., Avg. particle size=150 nm). The relative amounts of VAE copolymer and second polymer used in the tested formulations are provided in Table 11.

Figure 9:
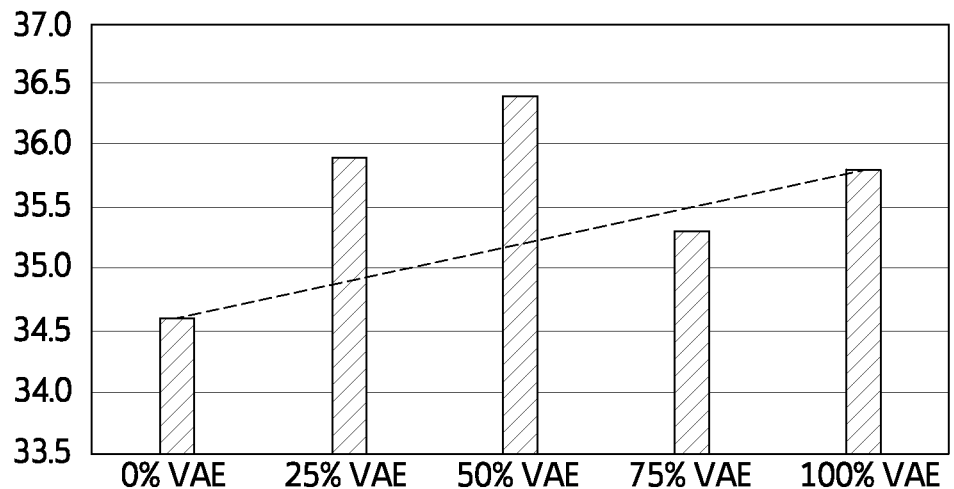
FIG. 9 is a graph showing improved gloss observed in latex blends comprising VAE and styrene/butadiene/acrylonitrile copolymers.
Figure 10:
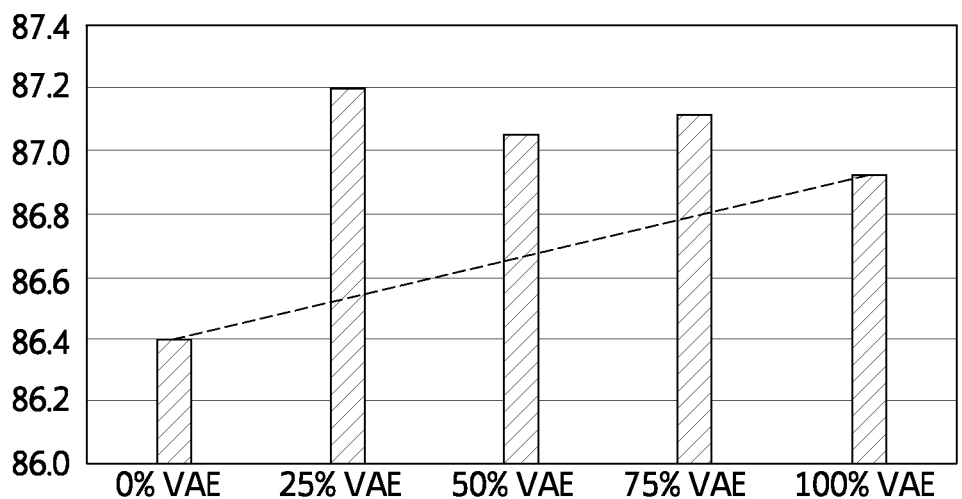
FIG. 10 is a graph showing brightness observed in latex blends comprising VAE and styrene/butadiene/acrylonitrile copolymers.

The coating compositions were applied to paperboard and tested for Gloss and (Hunter) Brightness. The resulting values are provided in Table 11 and in FIGS. 9 and 10. As shown, the blended formulations exhibited Gloss and Brightness values that surprisingly and unexpectedly exceeded virtually all expected values calculated based on the comparison Examples in Table 11.

TABLE 11

GLOSS AND BRIGHTNESS RESULTS FOR EXAMPLES 55-59

| EXAMPLE | % VAE 4[1] | Tested Gloss | Expected Gloss | Tested Brightness | Expected Brightness |
|---|---|---|---|---|---|
| 55 (Comp.) | 0 | 34.6 | N/A | 86.41 | N/A |
| 56 | 25 | 35.9 | 34.9 | 87.20 | 86.54 |
| 57 | 50 | 36.4 | 35.2 | 87.06 | 86.67 |
| 58 | 75 | 35.3 | 35.5 | 87.12 | 86.80 |
| 59 (Comp.) | 100 | 35.8 | N/A | 86.93 | N/A |

[1]Remainder SBA second polymer

Examples 60-64

Impact of External Crosslinkers on SIWA

In Examples 60-64, paper coating compositions were formulated according to Table 12 and tested with blends of varying amounts of VAE 1 and a commercially available SB dispersion (Dow 620), with and without external crosslinker (10% AZC). The coating compositions were applied to paperboard and tested for SIWA value. The resulting values are provided in Table 12. As shown, the blended formulations with external crosslinker exhibited surprisingly high SIWA values when compared to the individual (non-blended) formulations, with and without crosslinker.

TABLE 12

SIWA Values with and without AZC
EXAMPLES 60-64

| EXAMPLE | % VAE 1[1] | % AZC | SIWA |
|---|---|---|---|
| 60 (Comp.) | 0 | 0 | 97.25% |
| 61 (Comp.) | 100% | 0 | 98.21% |
| 62 (Comp.) | 100% | 10% | 96.50% |
| 63 | 50% | 0 | 97.22% |
| 64 | 50% | 10% | 99.10% |

[1]Remainder SB second polymer

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of the patentable novelty which reside in the present disclosure, including all features which would be treated as equivalents thereof by those skilled in the art to which the disclosure pertains.

We claim:

1. A latex dispersion, comprising:
    (a) a first copolymer of a vinyl ester of an alkanoic acid having from 1 to 13 carbon atoms and ethylene; and
    (b) a second copolymer of (i) styrene and butadiene, (ii) styrene, butadiene and acrylonitrile, or (iii) styrene and an acrylic monomer, wherein the first and second copolymers are colloidally dispersed in an aqueous medium comprising a surfactant; wherein the dispersion comprises less than 1.0 pphm polyvinyl alcohol.

2. The dispersion of claim 1, comprising less than 0.5 pphm polyvinyl alcohol.

3. The dispersion of claim 1, comprising less than 1.0 wt. percent polyvinyl alcohol, based on the total weight of all monomers.

4. The dispersion of claim 1, wherein the first copolymer has an average particle size from 100 to 300 nm, as determined by Laser Aerosol Spectroscopy.

5. The dispersion of claim 1, wherein the second copolymer is a copolymer of styrene and butadiene, the first copolymer is present in an amount from 70 to 95 wt. %, and the second copolymer is present in an amount from 5 to 30 wt. %.

6. The dispersion of claim 1, wherein the first copolymer is present in an amount from 40 to 99 wt. % and the second copolymer is present in an amount from 1 to 60 wt. %.

7. The dispersion of claim 1, wherein the first copolymer is present in an amount from 70 to 95 wt. %, and the second copolymer is present in an amount from 5 to 30 wt. %.

8. The dispersion of claim 1, wherein the first copolymer is present in an amount from 5 to 65 wt. %, and the second copolymer is present in an amount from 35 to 95 wt. %.

9. The dispersion of claim 1, wherein the first copolymer comprises a copolymer of vinyl acetate and ethylene.

10. The dispersion of claim 1, wherein the first copolymer is a copolymer of vinyl acetate, ethylene and vinyl chloride.

11. The dispersion of claim 1, wherein the first copolymer is a copolymer of vinyl acetate, ethylene and vinyl neodecanoate.

12. The dispersion of claim 1, wherein the first copolymer comprises a copolymer of vinyl neodecanoate and ethylene.

13. The dispersion of claim 1, wherein the second copolymer is a copolymer of styrene and butadiene.

14. The dispersion of claim 1, wherein the second copolymer is a copolymer of styrene, butadiene and acrylonitrile.

15. The dispersion of claim 1, wherein the second copolymer is a copolymer of styrene and an acrylic monomer.

16. The dispersion of claim 1, wherein the second copolymer is a copolymer of styrene, an acrylic comonomer, and acrylonitrile.

17. The dispersion of claim 1, wherein either the first copolymer or the second copolymer further comprises a polyethylenically unsaturated co-monomer selected from the group consisting of triallyl cyanurate, triallyl isocyanurate, diallyl maleate, diallyl fumarate, divinyl benzine, and diallyl phthalate.

18. The dispersion of claim 1, further comprising a pigment selected from the group consisting of kaolin clay, calcium carbonate, titanium dioxide, plastic pigments and combinations of said pigments.

19. The dispersion of claim 1, wherein the latex dispersion is stabilized with anionic and/or nonionic emulsifiers which are substantially free of alkylphenol ethoxylate surfactants.

20. The dispersion of claim 1, wherein the first copolymer comprises from 70 to 90 pphm vinyl acetate and from 10 to 30 pphm of ethylene.

21. The dispersion of claim 20, wherein the second copolymer comprises from 20 to 80 pphm of styrene and from 20 to 80 pphm of butadiene.

22. The dispersion of claim 20, wherein the second copolymer comprises from 20 to 75 pphm of styrene, from 20 to 75 pphm of butadiene and from 1 to 25 pphm of acrylonitrile.

23. The dispersion of claim 20, wherein the second copolymer comprises from 20 to 80 pphm of styrene, and from 20 to 80 pphm of the acrylic monomer.

24. The dispersion of claim 1, wherein the dispersion is stabilized with an ethoxylated nonionic surfactant.

25. The dispersion of claim 1, having a solids content from 40 to 70 wt. %.

26. The dispersion of claim 1, further comprising ammonium zirconium carbonate or potassium zirconium carbonate.

27. The dispersion of claim 1, wherein the dispersion comprises a blend of a first dispersion comprising the first copolymer and a second dispersion comprising the second copolymer.

28. The dispersion of claim 1, wherein the first and second copolymers are not intimately mixed.

29. The dispersion of claim 1, wherein the first copolymer is epoxy functionalized, carboxyl functionalized, silane functionalized, or a combination thereof.

30. A coating formed by the dispersion of claim 1, having a % IGT Dry Pick Value greater than 80%.

31. A coating formed by the dispersion of claim 1, having a SIWA % ink transfer value greater than 90%.

32. A coating formed by the dispersion of claim 1, having a brightness value of at least 87.

33. A coating formed by the dispersion of claim 1 on paperboard, having a roughness value less than 3.2.

34. A coating formed by the dispersion of claim 1 on paper, having a roughness value less than 1.5.

35. A coating formed by the dispersion of claim 1, having a gloss value from 30 to 60.

36. A paper coating composition, comprising the latex dispersion of claim 1, one or more pigments and one or more crosslinkers.

37. A process for forming a coated substrate product, the process comprising the steps of:
    (a) coating a substrate with the coating composition of claim 36 to form a wet coated substrate;
    (b) drying the wet coated substrate to form a dried coated substrate; and
    (c) calendering the dried coated substrate to form the coated substrate product.

38. The process of claim 37, wherein the coated substrate product comprises a coated paper substrate product.

39. A coating composition, comprising an aqueous surfactant-stabilized, copolymer latex binder, and sufficient alkali to achieve a pH of 6 to 10, the latex binder having dispersed therein a first copolymer of an alkanoic acid having from 1 to 13 carbon atoms and ethylene, and a second copolymer of (i) styrene and butadiene, (ii) styrene, butadiene and acrylonitrile, or (iii) styrene and an acrylic monomer, wherein the latex binder is stabilized with anionic and/or non-ionic emulsifiers; wherein the latex binder comprises less than 0.5 pphm polyvinyl alcohol.

40. The coating composition of claim 39, wherein the latex binder comprises less than 1.0 wt. percent polyvinyl alcohol, based on the total weight of all monomers.

41. The coating composition of claim 39, wherein the first copolymer has an average particle size from 100 to 300 nm, as determined by Laser Aerosol Spectroscopy.

42. The coating composition of claim 39, wherein the first copolymer is present in an amount from 60 to 99 wt. % and the second copolymer is present in an amount from 1 to 40 wt. %.

43. The coating composition of claim 39, substantially free of alkyl phenol ethoxylate surfactants.

44. The coating composition of claim 39, further comprising a pigment selected from the group consisting of clay, calcium carbonate, titanium dioxide, plastic pigments and combinations of said pigments.

45. A paper or paperboard substrate coated with from 1 $g/m^2$ to 30 $g/m^2$ of the coating composition of claim 39.

* * * * *